United States Patent [19]
Harrington et al.

[11] 3,773,619
[45] Nov. 20, 1973

[54] CONTROL OF NUCLEAR REACTORS

[75] Inventors: Eustace Lionel Ernest Harrington, Knutsford; Edward Duncombe, Hale, both of England

[73] Assignee: United Kingdom Atomic Energy Authority, London, England

[22] Filed: May 21, 1970

[21] Appl. No.: 39,302

[30] Foreign Application Priority Data
May 30, 1969 Great Britain.................... 27,659/67

[52] U.S. Cl............................. 176/86 M, 176/86 L
[51] Int. Cl.............................................. G21c 7/22
[58] Field of Search............ 176/86 G, 86 L, 86 M, 176/22

[56] References Cited
UNITED STATES PATENTS
| | | | |
|---|---|---|---|
| 3,498,881 | 3/1970 | Siddall................................ | 176/86 L |
| 3,414,476 | 12/1968 | Galli de Paratesi et al........ | 176/86 L |
| 3,284,307 | 11/1966 | Schortmann....................... | 176/86 L |
| 3,488,253 | 1/1970 | Yevick et al........................ | 176/22 |

FOREIGN PATENTS OR APPLICATIONS
799,001   7/1958   Great Britain.................... 176/86 M Primary Examiner—Harvey E. Behrend
Attorney—Larson and Taylor

[57] ABSTRACT

A control device chargeable as a unit into the core structure of a nuclear reactor comprises a reservoir and a receiver for a neutron absorbing liquid metal such as lithium 6. With the device located in the core structure of the reactor the receiver is located in the fuel zone of the core structure with the reservoir located above the receiver. A feed line for the lithium metal links the reservoir with the receiver and a flow coupler energised by flow of liquid metal reactor coolant is provided to inhibit the transfer of lithium from the reservoir to the receiver when the flow coupler is fully energised. Reduction of the degree of energisation of the flow coupler due for example to a fall in the rate of flow of liquid metal reactor coolant through the flow coupler results in transfer of lithium from the reservoir into the receiver to shut down the reactor. The flow coupler is also adapted to return the lithium from the receiver to the reservoir through a return line when energised by return to full rate of flow of liquid metal reactor coolant through the flow coupler.

4 Claims, 4 Drawing Figures

FLOW COUPLER SODIUM FLOW RATE
% OF FULL REACTOR COOLANT FLOW RATE.

CONTROL OF NUCLEAR REACTORS

BACKGROUND OF THE INVENTION

This invention relates to the control of nuclear reactors. In particular it is concerned with the control of reactors by the variation of the amount of neutron absorbing material within the core of the reactor.

SUMMARY OF THE INVENTION

According to the present invention a control device chargeable as a unit into the core structure of a nuclear reactor comprises a reservoir and a receiver for a neutron absorbing material arranged so that with the device fitted in the core structure of the reactor the receiver is located in the fuel zone of the core structure and the reservoir is located above the receiver outside the fuel zone of the core structure, a feed line for the neutron absorbing material linking the reservoir to the receiver, flow control means adapted, in a first state, to inhibit transfer of the neutron absorbing material under gravity through the feed line from the reservoir to the receiver and adapted, in a second state, to allow such transfer of the neutron absorbing material from the reservoir to the receiver, in order to shut down the reactor, initiation of a change between said first and second states of the flow control means being brought about by a change in a selected reactor parameter consequent on a fault condition arising in the reactor and means being provided for returning the neutron absorbing material through a return line from the receiver to the reservoir in order to return the reactor to an operational condition.

A liquid metal may be employed as the neutron absorbing material and the flow control means may comprise a flow coupler adapted in an energised state to inhibit transfer of the neutron absorbing liquid metal under gravity through the feed line from the reservoir to the receiver and adapted in a de-energised state to allow transfer of the neutron absorbing liquid metal from the reservoir to the receiver, said flow coupler also being adapted when energised to return the neutron absorbing liquid metal through the return line from the receiver to the reservoir.

In a liquid metal cooled nuclear reactor the flow coupler may be energised by a flow of liquid metal derived from the liquid metal coolant.

DESCRIPTION OF THE DRAWINGS

Embodiments of the invention will now be described by way of example with reference to the accompanying drawings in which.

DESCRIPTION OF THE PREFERRED EMBODIMENTS

Figure 1:
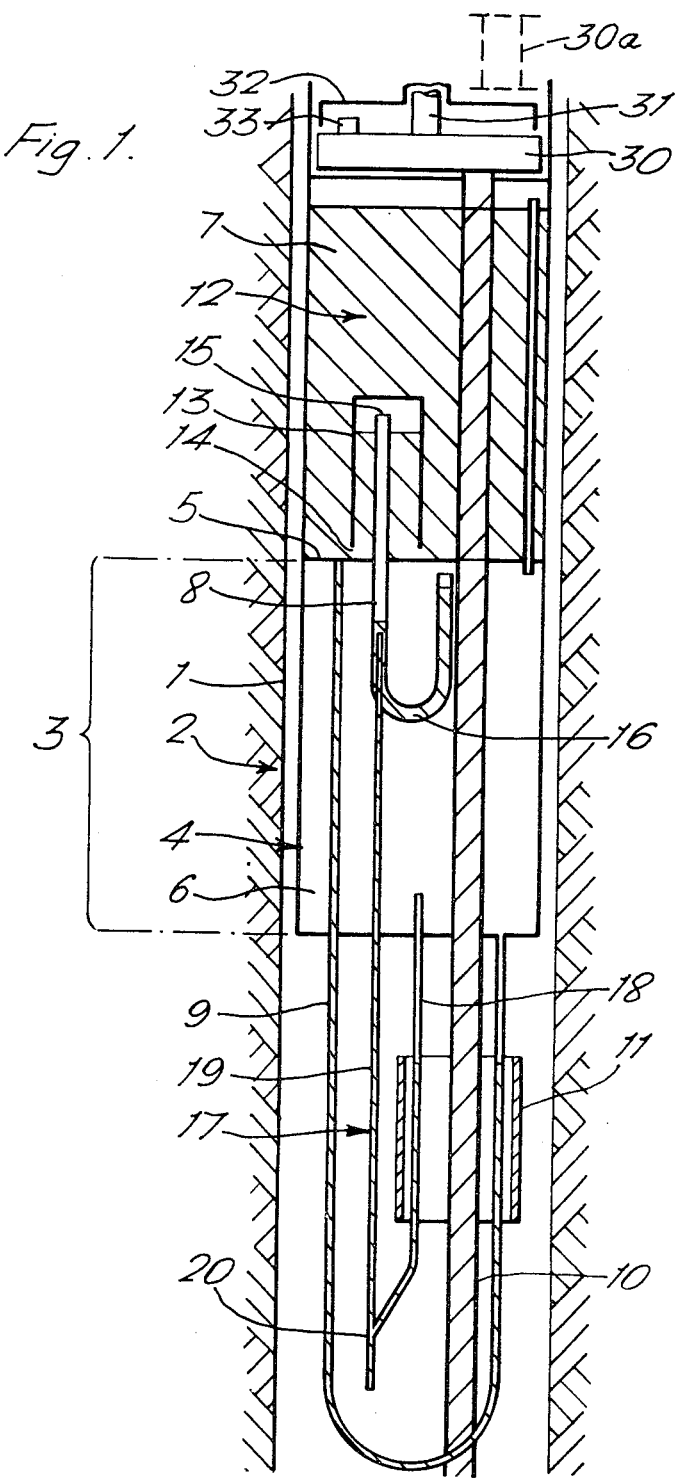
FIG. 1 is a longitudinal sectional elevation of a first embodiment of the invention

FIG. 1 of the drawings shows a control device applicable to a sodium cooled nuclear reactor. The device is mounted in a control or shut-off channel 1 of the reactor core structure 2 which has a central fuel zone 3. The device comprises a cylindrical casing 4 divided by a transverse baffle 5 into a lower receiver 6 which is located in the fuel zone 3 of the core structure 2 and an upper reservoir 7 disposed above the receiver 6. A feed line 8 links the reservoir 7 with the receiver 6 and a return line 9 links the receiver 6 to the reservoir 7. A duct 10 for sodium reactor coolant passes longitudinally through the casing 4 extending through the receiver 6 and the reservoir 7. The duct 10 and the return line 9 from the receiver 6 to the reservoir 7 extend through a flow coupler 11 of the type described hereafter.

The device of FIG. 1 is shown in a "withdrawn" condition that is with lithium 6 metal 12 held in the reservoir 7 out of the fuel zone 3 of the core structure 2.

In reservoir 7 there is disposed a syphon chamber 13 round the skirt 14 of which lithium metal can flow into the syphon chamber 13 and, under suitable conditions, into the open upper end 15 of feed line 8, which has a U-bend 16 at its lower end within the receiver 6. The free space above the lithium in the reservoir 7 and in the syphon chamber 13 is occupied by argon gas. The pressure of gas in the free space within syphon chamber 13 is governed by a control line 17 which has a leg 18 extending downwards from the receiver 6 through the flow coupler 11 and a parallel leg 19 extending downwards from the reservoir 7 through the receiver 6. The legs 18 and 19 of the control line 17 are joined at their lower ends by a Y junction 20. With the lithium metal 12 occupying the reservoir 7, the U bend 16 of the feed line 8 is filled with lithium metal. The leg 19 of the control line 17 is completely filled with lithium metal whilst the leg 18 of the control line 17 is filled with lithium metal up to the level of the top of the flow coupler 11.

The flow coupler 11 is of the type generally disclosed in British Pat. No. 745,460.

Figure 2:
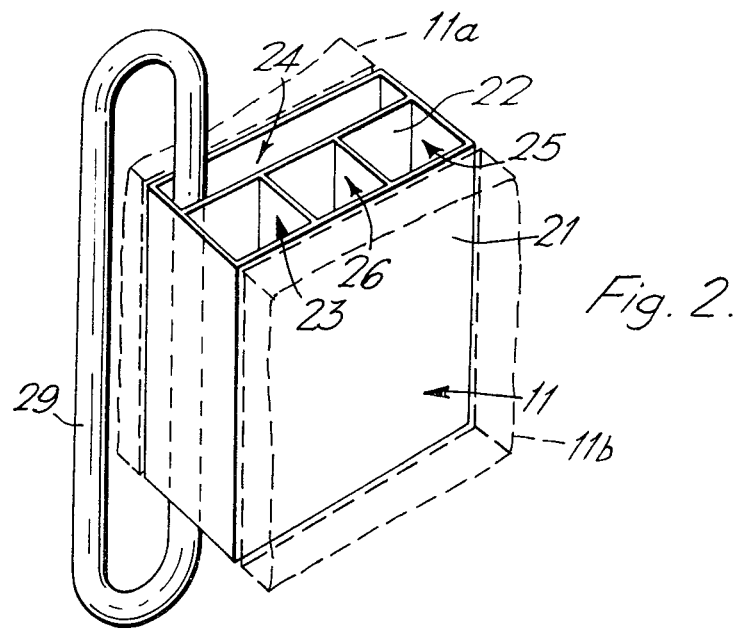
FIG. 2 is an isometric detail of a component of the device of FIG. 1
Figure 3:
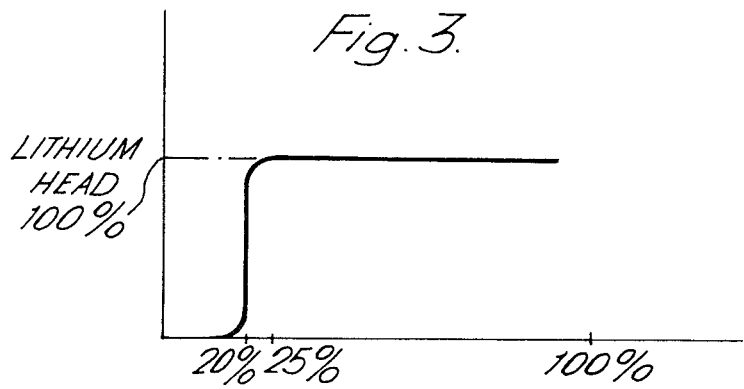
FIG. 3 is a graph

A flow coupler is an electromagnetic liquid metal pump comprising at least a pair of parallel ducts for liquid metal. A magnetic field is applied transversely across the ducts such that by pumping liquid metal through one of the ducts an EMF and hence a current is generated in the liquid metal being pumped through the duct. The EMF drives a current through the liquid metal in the second duct and in accordance with the Faraday principle an electromagnetic pumping action is exerted on the liquid metal in the second duct. As shown in FIG. 2 the flow coupler 11 is of parallel channel type and comprises a rectangular casing 21 divided by partitions 22 into ducts 23, 24, 25 and 26. A magnetic field is set up by a permanent magnet the poles 11a and 11b of which are shown in dotted outline passing tansversely across the ducts 23, 24, 25, and 26. In the arrangement of FIG. 1 the duct 10 for liquid sodium reactor coolant passes through the duct 23 of the flow coupler 11, the return line 9 from the receiver 6 to the reservoir 7 passes through the duct 25 and the leg 18 of the control line 17 passes through the duct 26. When sodium reactor coolant is passing upwards through the duct 10 as shown in FIG. 1 a downwards pumping action is exerted by the flow coupler 11 on lithium in the return line 9 and the leg 18 of the control line 17. The flow coupler 11 may have a switching line 29 passing through the duct 24. The switching line 29 is a closed loop with sodium contained in the bottom U of the loop. The effect of this switching line 29 is that as reactor coolant sodium flow through the duct 10 is gradually increased there is initially no pumping action on the lithium in the return line 9 and the leg 18 of the control line 17. At first as the rate of flow of reactor coolant sodium through the duct 10 is increased static sodium in the bottom U of the switching line 29 is drawn up into the duct 24 of the flow coupler 11. At a threshold value of reactor coolant sodium flow rate through the duct 10 maximum pumping action is rapidly achieved on the lithium in the return line 9 and the leg 18 of the control line 17. This is shown in FIG. 3 where the threshold pumping effect is shown as occurring at a sodium flow rate of about 25 percent of the full reactor sodium coolant flow rate.

An adjustable gag 30 is fitted at the upper end of the duct 10. Adjustment of the gag 30 is by means of a rod 31 extending through penetrations in the reactor roof. Also a flow cut off plate 32 is mounted over the sodium outlet 33 from the gag 30 The plate 32 is held up by a magnet 30a (shown diagrammatically which can be de-energised to drop the plate 32 into place over the sodium outlet 33.

In the case, for example, of a flow coupler 11 having a threshold pumping effect at 25 percent of the full reactor sodium coolant flow rate the gag 30 is set so that the sodium flow rate through the duct 10 corresponds to 30 percent reactor sodium coolant flow rate. In this condition the flow coupler 11 generates a downwardly acting pressure in the lithium within the leg 18 of the control line 17 (since the leg 18 passes through the flow coupler 11). This pressure acts through the leg 19 of the control line 17 to maintain sufficient gas pressure above the lithium in the syphon chamber 13 to prevent the lithium level in the syphon chamber 13 rising to the open upper end 15 of the feed line 8 despite the head of lithium in the reservoir 7 and the pressure of gas above the surface of lithium in the reservoir 7. The flow coupler 11 also applies a downwardly acting pressure in the lithium in the return line 9 from the receiver 6 to the reservoir 7. The flow coupler 11 generates a sufficient head to prevent lithium discharging from the reservoir 7 into the receiver 6 through the return line 9.

In the event of reactor coolant sodium flow through the duct 10 falling below the threshold value of 25 percent of full reactor coolant flow rate the pressure induced by the flow coupler 11 in the lithium within the control line 17 will fall. As a consequence of the pressure loss in the leg 19 of switching line 17 the gas pressure above the surface of the lithium in the syphon chamber 13 will fall so that the head of lithium in the reservoir 7 will be sufficient to drive the lithium in the syphon chamber upwardly to cause lithium overflow through the upper open end 15 of feed line 8 and so into the receiver 6. This flow of lithium from the reservoir 7 into the receiver 6 will continue until the reservoir 7 is drained of lithium to below the level of the skirt 14 of the syphon chamber 13 even if the reactor coolant sodium flow through the duct 10 is returned to its normal value of 30 percent of full reactor coolant flow rate during the lithium injection period. Loss of pressure will also occur in the return line 9 from the receiver 6 to the reservoir 7. Hence some lithium will flow from the reservoir 7 into the receiver 6 through the return line 9 and there will also be some lithium flow from the reservoir 7 into the receiver 6 through the control line 17. However the return line 9 and the control line 17 are made of small bore compared with the feed line 8 so that the majority of lithium flow will be through the feed line 8. On completion of lithium transfer from the reservoir 7 into the receiver 6 the free space above the lithium in the receiver 6 and the free space in the reservoir 7 is occupied by argon gas whose pressure in the free spaces is equalised by a vent line 32 extending between the receiver 6 and the reservoir 7. As the bottom U-bend 16 in the feed line 8 remains filled with lithium the control line 17 will also remain filled with lithium.

When reactor coolant sodium flow through the duct 10 is subsequently returned to its normal value of 30 percent of full reactor coolant flow the flow coupler 11 will pump lithium at a slow rate from the receiver 6 through the return line 9 into the reservoir 7. Also the flow coupler 11 will re-establish pressure in the lithium in the control line 17. As the reservoir 7 fills, gas will be trapped in the syphon chamber 13 and pressurised so as to result in the final level differences shown in FIG. 1 ie with the lithium once again held in the reservoir 7. In view of the differences in bore sizes between the return line 9 and the feed line 8 lithium cannot be withdrawn from the receiver 6 at a greater rate than that at which it can flow into the receiver 6 through the feed line 8, providing a safety measure.

It will be seen that the control device of FIG. 1 operates to shut down the reactor if the reactor coolant flow rate falls to a level such that the reactor coolant sodium flow rate through the duct 10 falls below the level for threshold excitation of the flow coupler 11. Also the device can be made to operate by stopping or inhibiting flow of reactor coolant sodium through the duct 10 by dropping the flow cut off plate 32. The plate 32 is dropped by de-energisation of its supporting magnet, the magnet being de-energised in response to a suitable transducer sensitive to a change in some other reactor parameter which could lead to a need for reactor shut down — typically high fuel temperature, high flux density or a signal indicating a failure of fuel sheathing.

Figure 4:
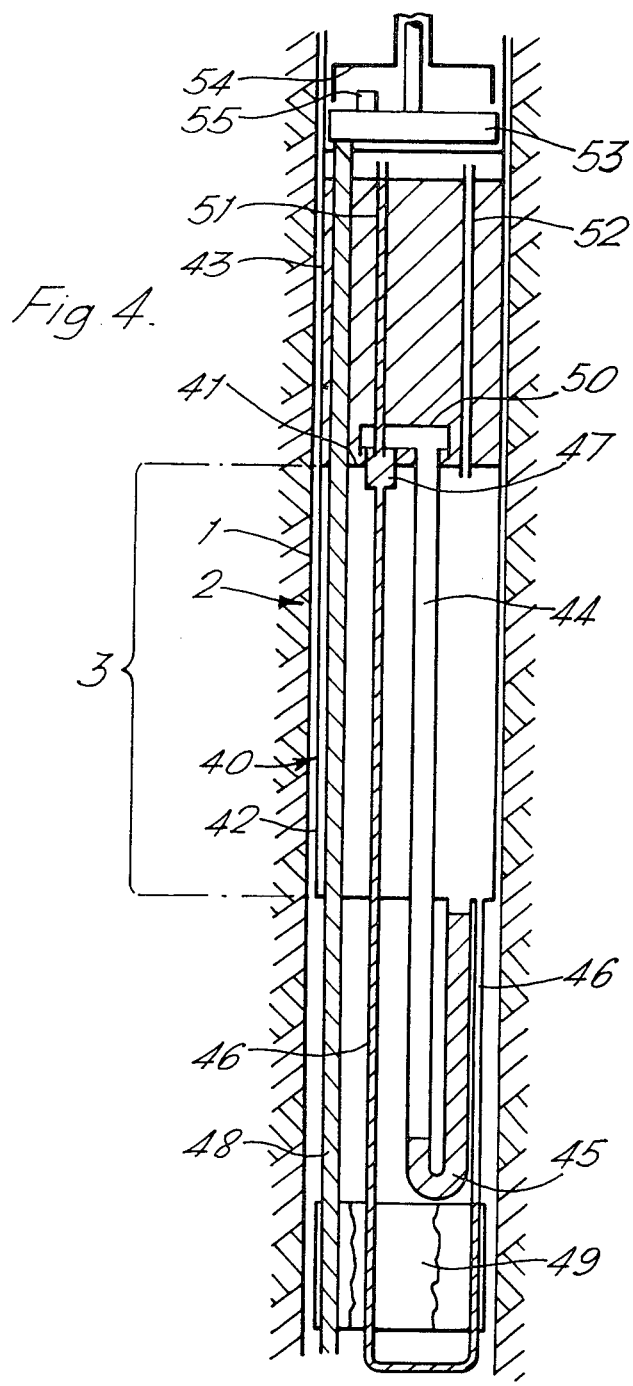
FIG. 4 is a longitudinal sectional elevation of a second embodiment of the invention

Referring to FIG. 4 of the drawings this shows a second form of control device also applicable to a sodium cooled nuclear reactor. Again the device is mounted in a control or shut off channel 1 of the reactor core structure 2 which has a central fuel zone 3.

The device comprises a cylindrical casing 40 divided by a transverse baffle 41 into a lower receiver 42 which is located in the active region 3 of the core structure 2 and an upper reservoir 43 disposed above the receiver 42. A discharge line 44 having a U bend 45 at its lower end leads from the bottom of the reservoir 43 to the bottom of the lower receiver 42. A return and control line 46 leads from the lower end of the receiver 42 to the lower end of the reservoir 43. The line 46 terminates in a cup 47 at its upper end within the reservoir 43. A duct 48 for sodium reactor coolant passes longitudinally through the casing 40, extending through the receiver 42 and the reservoir 43. The duct 48 and the line 46 from the receiver 42 to the reservoir 43 extend through a flow coupler 49 of similar type to that shown in FIG. 2. A gas lock bell 50 is fitted in the reservoir 43 over the cup 47 at the upper end of the line 46 and the upper end of the discharge line 44 in the reservoir 43. A gas lock break tube 51 extends vertically from the cup 47 at the upper end of the line 46 through the gas lock bell 50 to the upper end of the reservoir 43. The upper end of the reservoir 43 is connected with the upper end of the receiver 42 by a vent line 52. Similarly to the control device of FIG. 1 an adjustable gag 53 is fitted at the upper end of the duct 48 and also a magnetically supported flow cut off plate 54 is mounted over the sodium outlet 55 of the gag 53.

Normally in the "withdrawn" condition of the device of FIG. 4 lithium metal is held in the upper reservoir 43 and for shut down of the reactor the lithium is allowed to flow by gravity from the upper reservoir 43 into the lower receiver 42 in the fuel zone 3 of the reactor core structure 2.

The detailed operation of the device is best described by starting with the condition in which the device is "inserted" ie with the lithium contained in the receiver 42.

Assuming that the gag 53 is set to provide a sodium flow through the duct 48 of 25 percent of full reactor coolant flow rate and that the flow coupler 49 is of the type fitted with a switching line 50 as to beocme activated at a flow rate of 20 percent full flow and so as to reach maximum pumping efficiency at 25 percent full flow.

On raising the reactor coolant flow to result in 20 percent flow in the duct 48 lithium will begin to be pumped from the lower receiver 42 into the upper reservoir 43 through the line 46. At a reactor coolant flow corresponding say to 25 percent flow through the duct 48 maximum pumping efficiency of the flow coupler 49 is achieved, the flow coupler 49 generating, for example, a 2 metre head of lithium at this flow rate. Typically it will take about 10 minutes to transfer the lithium from the lower receiver 42 to the upper reservoir 43 under these conditions and this ensures a low rate of reactivity withdrawal. Whilst the upper reservoir 43 is being filled with lithium, argon cover gas is displaced via the vent line 52 to the lower receiver 42. Since the lithium is supplied to the upper reservoir 43 by overflow from the cup 47 under the gas lock bell 50 some cover gas is trapped under the bell 50. A U of lithium which is always present in the U-bend 45 at the lower end of the discharge line 44 prevents gas escaping into the lower receiver by this route. The gas lock break tube 51 dips into the cup 47 at the upper end of the line 46. The transfer of lithium ceases when the level of lithium in the right hand leg of the line 46 passes below the top of the flow coupler 49. When this occurs the efficiency of the flow coupler 49 decreases so as to maintain an approximately constant delivery head if sodium flow through the duct 48 increases above 25 percent full reactor coolant flow.

In this condition the control device is in the "withdrawn" state with lithium in the upper reservoir 42 below the top of the gas lock break tube 51 and the vent line 52. Within the gas lock bell 50 the lithium surface lies below the entrance to the discharge line 44 and within the U bend 45 at the bottom of the discharge line 44 the lithium is depressed on the inlet side as shown in FIG. 4. The cup 47 is full of lithium and so is the gas lock break tube 51. Now suppose that the delivery pressure of the flow coupler 49 acting on the lithium in the line 46 falls by a small amount, eg, 1 centimetre, equal to the amount by which the gas lock break tube 51 dips into the cup. (The delivery pressure of the flow coupler 49 will fall for example due to fall in sodium flow rate through the duct 48 consequent on a fall in the reactor coolant flow rate) The end of the gas lock break tube 51 will be disconnected from the lithium surface in the cup 47 and the lithium in the gas lock break tube will partly discharge into the cup 47 and then be blown out by the excess gas pressure in the gas lock bell 50 into the main body of lithium in the upper reservoir 43 and the gas pressure under the gas lock bell will drop. The lithium in the upper reservoir 43 is then hydrostatically unstable and it will rise in the gas lock bell 50, overflow into the discharge line 44 and from thence into the lower receiver 42, until the lower edge of the gas lock bell 50 is above the free lithium surface in the upper reservoir 43.

The control device of FIG. 4 can also be caused to "insert" by dropping of the flow cut off plate 54 to inhibit or cut off sodium flow through the duct 48. In this case also the flow cut off plate 54 is dropped by de-energisation of its holding magnet in response to a change in a reactor parameter resulting from a fault condition arising.

In the case of the control devices shown in FIGS. 1 and 4 the flow couplers are powered by flow of sodium drawn from the main reactor coolant flow (Thus in the particular case employing failure of coolant flow as the parameter change causing "insertion" of the devices to shut down the reactor). In the case of a non-metal liquid or gas or vapour cooled reactor the flow couplers may be powered by a separate liquid metal circuit and the flow of reactor coolant may drive a turbine which is coupled to a liquid metal pump in the separate circuit. In this way the coolant flow is directly correlated with the independent liquid metal flow, changes in the coolant flow producing corresponding changes in the independent liquid metal flow.

The control devices of FIGS. 1 and 2 can also be caused to "insert" if overheating of the reactor coolant sodium occurs. If the magnets of the flow couplers are selected from a material which loses its magnetic property when its Curie temperature is exceeded then on that temperature being exceeded (typically when gamma heating from the reactor core structure exceeds cooling produced by flow of sodium coolant) the magnetic property would disappear and the coupling action of the flow couplers would be lost.

The control devices of the above embodiments have the advantage of being chargeable as a unit into an existing control rod channel of a nuclear reactor the devices also being removable from the channel for maintenance as a unit.

We claim:

1. In combination with a liquid metal cooled nuclear reactor system a control capsule chargeable and dischargeable as a unit into and from said system, said capsule comprising, for a liquid metal neutron absorber to control said system, an upper reservoir and a lower receiver, a first pipe from the reservoir to the receiver of U-shape having a flow control element for controlling liquid metal neutron absorber flow from reservoir to receiver, a second pipe defining an inlet opening and an outlet opening for flow of liquid metal coolant of said reactor system through the capsule, and electromagnetic coupling means associating a predetermined coolant flow, on the one hand, and a predetermined reduction of said coolant flow, on the other hand, in said second pipe with said flow control element so that with said predetermined flow the flow control element acts to prevent flow of liquid metal neutron absorber from the reservoir to receiver and with predetermined reduction of flow the flow control element acts to permit flow of liquid metal absorber from the reservoir to the receiver, said coupling means comprising means for setting up a magnetic field passing transversely across a plurality of ducts one of said ducts having with said second pipe passing through it so that flow of liquid metal coolant through said second pipe generates an electromagnetic force by interaction with said magnetic field, and another of said ducts having with said flow control element containing liquid metal absorber passing through it, and arranged to accept in said absorber the generated electromagnetic force from the coolant to create, by interaction with said magnetic field, pressures in the liquid metal absorber of the control element to prevent or permit flow of liquid metal absorber through said first pipe from reservoir to receiver, and means for returning liquid metal neutron absorber in the receiver to the reservoir.

2. The combination of claim 1 wherein the means for returning absorber in the receiver to the reservoir comprises a third pipe passing through yet another of said plurality of ducts, and containing liquid metal absorber, and arranged to accept in that absorber the generated electromagnetic force from the coolant to create, by interaction with said magnetic field, pressures in that absorber to cause absorber to be pumped back from the receiver to the reservoir when a predetermined flow is reestablished in the flow of liquid metal coolant in said second pipe.

3. The combination of claim 2 wherein the U-shaped first pipe comprises gas lock forming means connected with that end of said first pipe which is open to the reservoir to prevent or permit flow of absorber from reservoir to receiver, and said flow control element is a pipe containing liquid metal absorber located in said gas lock forming means to release or sustain the lock according to pressures created in the pipe of the control element.

4. The combination of claim 1 having flow preventing means insertable in said second pipe and an electromagnet for holding said means in the non-inserted position from where it can fall by gravity to the inserted position on de-energising the electromagnet whereby said flow control element is actuated to permit flow from the reservoir to the receiver.

* * * * *